(No Model.)

G. E. ADAMS.
BRACELET.

No. 310,011. Patented Dec. 30, 1884.

WITNESSES:
Irving Champlin
Charles K. Raynsford

INVENTOR:
George E. Adams

UNITED STATES PATENT OFFICE.

GEORGE E. ADAMS, OF PROVIDENCE, RHODE ISLAND.

BRACELET.

SPECIFICATION forming part of Letters Patent No. 310,011, dated December 30, 1884.

Application filed April 23, 1884. (No model.)

*To all whom it may concern:*

Be it known that I, GEORGE E. ADAMS, of the city and county of Providence, in the State of Rhode Island, have invented a new and useful Improvement in Bracelets; and I declare the following to be a specification thereof, reference being had to the accompanying drawings.

Figure 1:
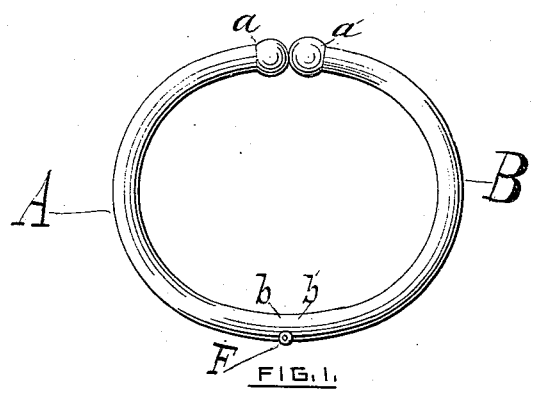
Figure 2:
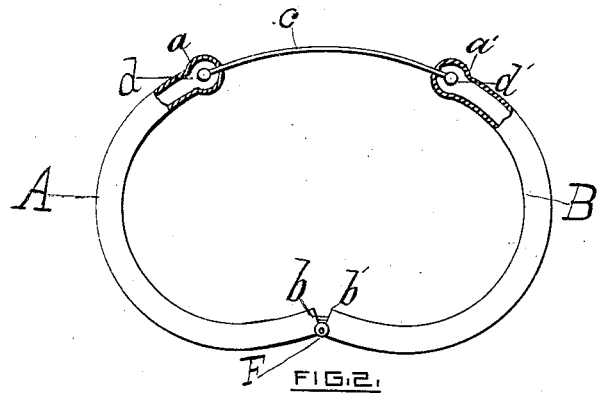
Figure 4:
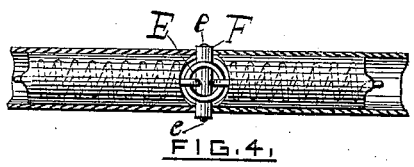
Figure 3:
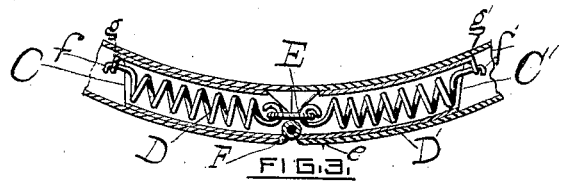

Figure 1 is a side elevation of the bracelet closed. Fig. 2 is a side elevation of the bracelet open. Fig. 3 is a partial longitudinal sectional view through the hinge, at right angles with a longitudinal extension thereof, showing the spiral wires and ring in position. Fig. 4 is a partial longitudinal sectional view through the ring parallel with the plane thereof.

My invention relates to bracelets so constructed that they may be opened or enlarged by means of a hinge or hinges and closed by the pressure or traction of a spring or springs.

In the accompanying drawings, A and B are the arms of the bracelet. C and C' are interior boxes or tubes designed to inclose the spiral springs. D and D' are the spiral springs. E is the ring or link connecting the springs. F is the hinge upon which the arms turn; $a$ and $a'$ and $b$ and $b'$, ends of the arms; $c$, the rod or wire connecting the ends $a$ and $a'$; $d$ and $d'$, enlarged ends of the rod or wire; $e$, the pivot of the hinge; $f$ and $f'$, the ends of the spiral springs; $g$ and $g'$, apertures in the ends or in appendages of the ends of the boxes or hollow cylinders C and C'.

The arms of the bracelet may be constructed of any proper material. Laterally they may be cylindrical, octagonal, or of any desired shape. The whole extent of the arms is preferably hollow, although, if desired, the central portions thereof may be solid and the ends hollow. Perforations are made in the centers of the ends $a$ and $a'$, designed to receive the rod or wire $c$. The rod or wire $c$, of metal or other suitable material, is laterally preferably cylindrical in form, and longitudinally preferably curved to conform to the curve of those portions of the arms within which it operates. It is of any desired length, and is provided with enlarged ends which are of greater diameter than that of the perforations aforesaid, through which it passes, whereby the movements of the rod and of the arms are limited. The rod is secured to the arms by inclosing the ends $d$ and $d'$ within the arms in such manner that it will pass freely through the apertures of the ends $a$ and $a'$, being limited in its movements as aforesaid. The rod limits the separation of the ends $a$ and $a'$, and serves as a guard to prevent the bracelet, when accidentally unclasped, from being lost, and as a guide for the arms. If desired, one end of the rod may be immovably secured within one of the arms, and the other end allowed to move freely within the other arm. One or more springs are secured within the ends $b$ and $b'$ of the arms A and B in such manner as to exert upon the latter a constant inward lateral pressure, tending to bring and keep the ends $a$ and $a'$ in contact with each other. The springs may consist of two spiral wires, D and D', Fig. 3, connected by the link E. The spiral wires may be inclosed within two boxes or cylindrical tubes, C and C', and there secured, as shown in Fig. 3. The wires are of such a length that the ends thereof, $f$ and $f'$, do not reach the apertures $g$ and $g'$ when the springs are placed within the tubes C and C', as aforesaid, but the spirals are extended or elongated until the ends $f$ and $f'$ enter the apertures $g$ and $g'$, where they are secured. The spiral springs as thus secured, when connected by the link E, exert a constant traction upon the outer ends of the tubes C and C', tending to draw or close them together upon the hinge F. The hinge F is secured to the tubes C and C' by soldering or otherwise. The springs D and D', connected by the link or ring E, are placed within the cylinders or boxes C and C' in such manner that the connecting-link E is directly over or upon the hinge F, as shown in Figs. 3 and 4. When the springs are secured within the tubes C and C', as aforesaid, the latter are inserted in the ends $b$ and $b'$ of the arms, as shown, and there secured by soldering or otherwise. When the tubes C and C' are thus secured, the traction of the spiral springs therein inclosed causes the ends $a$ and $a'$ to meet and remain in contact until forcibly separated.

If desirable, the springs may be secured within the ends $b$ and $b'$ without the use of the tubes or boxes C and C', in which case the hinge may be secured directly to the arms. A bracelet as thus constructed may have longitudinally an elliptical or other desired shape or form. The arms A and B are preferably of equal length. When the bracelet is adjusted upon the wrist, the ends $a$ and $a'$ are preferably opposite the hinge F, the former being upon the upper and the latter upon the under side of the wrist. As thus constructed, a bracelet is self-adjusting, and therefore superior to the bracelets in common use.

The chain or other appendage which is usually attached to a bracelet to prevent its loss, and which frequently injures delicate fabrics attached to the wrist, is replaced in my bracelet by the wire $c$, Fig. 2, which is hidden from view when the bracelet is closed, and which presents a smooth polished surface when the bracelet is open.

I claim as a novel and useful invention and desire to secure by Letters Patent—

A bracelet composed of the tubular hinged arms A B, interior boxes, C C', springs D D', connected to the outer ends of said boxes, ring E, for connecting the inner ends of the springs, and the safety connecting rod or wire $c$, having enlarged ends $d$ $d'$, substantially as shown and described.

GEORGE E. ADAMS.

Witnesses:
IRVING CHAMPLIN,
CHAS. K. RAYNSFORD.